2,916,415

PESTICIDAL PHOSPHORUS ESTERS

Joe R. Willard and John F. Henahan, Middleport, N.Y., assignors to Food Machinery and Chemical Corporation, New York, N.Y., a corporation of Delaware No Drawing. Application April 23, 1957
Serial No. 654,469

13 Claims. (Cl. 167—22)

This invention relates to new and useful derivatives of methylene bisdithiophosphates, and to pesticidal compositions containing the same.

The compounds of this invention have the general formula

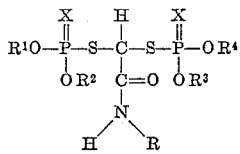

wherein R', R$^2$, R$^3$ and R$^4$ are the same or different organic radicals, X is oxygen or sulfur, and R is hydrogen or an organic radical. These bis-dithiophosphates have acaricidal, insecticidal, fungicidal and nematocidal properties. Although activity varies among different members of the class, in general these compounds are highly toxic towards a large variety of pests. In pesticidal compositions exhibiting most marked activity at low concentrations, those compounds wherein R, R', R$^2$, R$^3$ and R$^4$ are lower alkyl radicals, and X is sulfur, are generally preferred.

The compounds of this invention may be prepared by reacting an N-substituted dihaloacetamide with a salt of the appropriate dialkyl phosphorothioic or phosphorodithioic acid. The halogen atoms of the dihaloacetamide may both be the same, such as chlorine or bromine; or if it is desired to prepare, in a two-step reaction, a compound wherein R$^3$ and R$^4$ are different from R' and R$^2$, the reaction may be facilitated by using, for example, a chlorobromoacetamide as reactant. In addition, mixtures of phosphorus diesters may be used to obtain a desired combination of radicals in the final product.

The R group of the dihaloacetamide may be hydrogen or an organic radical. For example, the radical may be saturated or unsaturated alkyl, cycloalkyl, aralkyl, alkaryl, heterocyclic, and substituted derivatives thereof, including, for example, radicals such as methyl, ethyl, isopropyl, sec.-butyl, cyclohexyl, 2-ethylhexyl, n-octyl, benzyl, phenylethyl, carboxymethyl, and the like. The R group may also be aryl, such as phenyl or substituted phenyl, including such derivatives as chlorophenyl, nitrophenyl, methoxyphenyl, biphenyl and the like. It is seen that a wide variety of organic radicals are encompassed within the scope of R, the bisdithiophosphates prepared from these dihaloacetamides providing a new and useful class of compounds.

The phosphorothioic or phosphorodithioic acid diester used in this reaction is preferably reacted as a salt, such as the alkali metal and alkaline earth salts and the ammonium and silver salts. The phosphorus acid diester itself may be prepared by methods known in the art. For instance, a diester of dithiophosphoric acid may be prepared by reacting an alcohol or a mixture of alcohols with phosphorus pentasulfide. Depending on the alcohols used, the esterifying groups may be any organic radical or mixtures thereof.

In the preferred process of this invention, two molar equivalents of the appropriate phosphorothioic or phosphorodithioic acid is dissolved in a solvent such as ethanol or dioxane, and a solution of the metal hydroxide is added until the pH is about seven. A 25–40% solution of potassium hydroxide in ethanol is a convenient reagent. A preformed salt of the phosphorus acid may also be used, dissolved in a solvent. To the neutral solution is added one molar equivalent of the desired dihaloacetamide, and the mixture is heated until the reaction is complete. This generally requires about 4–14 hours under reflux. The product is then separated and tested for pesticidal activity.

This class of compounds is characterized by a broad scope of pesticidal activity, including insecticidal, fungicidal, acaricidal, ovicidal, and nematocidal properties; in addition, some of these compounds show systemic activity. This unusually broad range of activity appears to be a general characteristic of this class of compounds, some of which of course show higher toxicity and greater specificity than others.

These compounds are made into pesticidal compositions by formulation as aqueous emulsions, as dry or wettable powders, as solutions or in any other suitable vehicle. The compositions can be utilized as sprays, as dusts, as aerosol mixtures, as insecticidal coating compositions, and as residues. In general, they can be applied by methods commonly used for the control or eradication of insects, mites and the like. Thus, these compositions may be formulated with solvents, diluents, carrier media, adhesives, spreading, wetting and emulsifying agents and other ingredients. These compounds may be used as the sole toxic ingredient in pesticidal formulations, or in combination with other toxicants or synergists for specific applications.

The toxicants of this invention may be employed in controlling many types of pests, including insects, arachnids, nematodes and fungi, such as, for example, the German roach (Blattela germanica (L.)), Mexican bean beetle (Epilachnia varivestis (Muls.)), southern armyworm (Prodenia eridania (Cram.)), pea aphid (Macrosiphum pisi (Kltb.)), two-spotted spider mite (Tetranychus bimaculatus (H.)), bean rust (Uromyces appendiculatus), cucumber anthracnose (Colletotrichum lagenarium), early blight of tomato (Alternaria solani), late blight of tomato (Phytophthora infestans), the rootknot nematode (Meloidogyne incognita), and the like. Standard test methods are used for measuring the activity of these toxicants.

A typical formulation used to evaluate the toxicants of this invention is a wettable powder containing 25% of the candidate pesticide, 72% attaclay (fuller's earth) and 3% of an alkyl aryl polyether alcohol as wetting agent. In routine testing, this wettable powder is applied to plant foliage by applying as an aqueous dispersion, at a dilution of 1250 parts of toxicant per million parts of dispersion.

The following examples illustrate the preparation and pesticidal behavior of typical compounds of this invention. All parts are by weight.

EXAMPLE 1

To an ethanolic solution of 37.2 parts of O,O-diethyl hydrogen phosphorodithioate was added 25% ethanolic potassium hydroxide slowly to a pH of 6.0–6.5, maintaining the temperature below 50° C. during the addition. To this solution of potassium O,O-diethylphosphorodithioate was added 15.6 parts of N-ethyl dichloroacetamide. The mixture was heated under reflux for two and one-half hours. After filtering off the precipitated potassium bromide the filtered mixture was concentrated under reduced pressure. An equal volume of diethyl ether was added, and the solution was dried over sodium sulfate. Removal of the ether from the dried solution yielded 27.7 parts (67% yield) of bis(S-(diethoxyphosphinothioyl)-mercapto)N-ethylcarbamylmethane having a refractive index $n_D^{25}=1.5020$. Analysis: Calcd. for $$C_{17}H_{27}NO_5P_2S_4$$

P: 13.59, S: 28.15. Found: P: 13.52, S: 29.50.

This compound was formulated for pesticidal testing by preparing a wettable powder concentrate containing 25.0% of the compound, 3% of an alkyl aryl polyether alcohol and 72.0% attaclay. At 1250 p.p.m. in aqueous emulsion, it exhibited 100% kill of the southern armyworm, the German roach and the Mexican bean beetle.

EXAMPLE 2

Additional compounds of this series may be prepared, following the method illustrated in Example 1. Tabulated below are the refractive indexes, analyses and yield data for various compounds prepared by reacting the appropriate dihaloacetamide and dialkyl phosphorodithioate salt, and having the general formula:

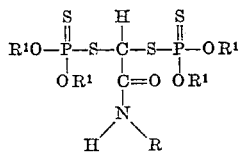

Table 1.—Bis(S-(dialkoxyphosphinothioyl)mercapto)-acetamides

| Compound | | Yield, Percent | $n_D^{25}$ |
|---|---|---|---|
| R' | R | | |
| Ethyl | Hydrogen | 53 | 1.5017 |
| Methyl | Ethyl | 31 | M.P. 59–51° C. |
| Ethyl | Methyl | 66 | 1.4973 |
| Do | Ethyl | 67 | 1.5020 |
| Do | n-Propyl | 96 | 1.5068 |
| Do | Isopropyl | 74 | 1.5085 |
| Do | Isobutyl | 36 | 1.4995 |
| Do | tert.-Butyl | 65 | 1.5035 |
| Do | n-Octyl | 81 | 1.5968 |
| Do | 2-Ethylhexyl | 56 | 1.4878 |
| Do | Allyl | 74 | 1.5118 |
| Do | Benzyl | 58 | semi-solid |
| Do | Phenylethyl | 58 | 1.5375 |
| Do | Cyclohexyl | 14 | 1.5065 |
| Do | Phenyl | 74 | 1.5532 |
| Do | 4-Chlorophenyl | 69 | 1.5508 |
| Do | 4-Nitrophenyl | 48 | 1.5592 |
| Do | 4-Methoxyphenyl | 67 | 1.5515 |
| Do | Carboxymethyl | 80 | 1.5060 |
| Isopropyl | Ethyl | 82 | opaque liq. |

These compounds were shown by tests to be pesticidal toxicants. In Table 2 below are listed the results of screening tests against insects and mites. A wettable powder formulation, diluted to 1250 p.p.m., is applied to plant foliage, the treated plants are infested, and observations made at intervals to determine the efficacy of the compounds as toxicants.

Table 2.—Initial contact insecticidal and acaricidal activity

| Compound | | Per Cent Kill at 1,250 p.p.m. | | | |
|---|---|---|---|---|---|
| R' | R | Two-spotted Mite | German Roach | Mexican Bean Beetle | Pea Aphid |
| Ethyl | Hydrogen | 100 | 0 | 40 | 0 |
| Do | Methyl | 100 | 100 | 100 | 100 |
| Isopropyl | Ethyl | 100 | 0 | 0 | 60 |
| Ethyl | Allyl | 100 | 100 | 85 | 100 |
| Do | n-Propyl | 100 | 90 | 100 | 100 |
| Do | T-Butyl | 100 | 15 | 75 | 40 |
| Do | N-Octyl | 100 | 0 | 0 | 3 |
| Do | Benzyl | 100 | 20 | 75 | 5 |
| Do | Phenylethyl | 100 | 0 | 100 | 85 |
| Do | Phenyl | 100 | 100 | 25 | 10 |
| Do | 4-Chlorophenyl | 100 | 0 | 55 | 35 |
| Do | 4-Nitrophenyl | 100 | 0 | 35 | 0 |
| Do | 4-Methoxyphenyl | 100 | 0 | 0 | 0 |
| Do | Cyclohexyl | 100 | 0 | 60 | 0 |
| Do | Carboxymethyl | 99 | 0 | 30 | 0 |

Fungicidal activity was evaluated by testing against four plant pathogens each of which is capable of producing a discreet lesion on a specific host plant. The candidate toxicant is applied to the host plant foliage as an aqueous emulsion of a wettable powder. The plants are allowed to dry and the appropriate pathogen is applied by spraying an aqueous suspension of the spores. The control obtained is determined by comparison of the number of lesions on the chemically treated plant with the number of lesions on plants which were inoculated without prior chemical treatment. In Table 3 below are presented results obtained when the candidate fungicide is applied at a dilution of 1250 p.p.m.

Table 3.—Fungicidal activity

| Compound | | Percent control at 1,250 p.p.m. | | | |
|---|---|---|---|---|---|
| R' | R | Early blight | Late blight | Bean rust | Cucumber Anthracnose |
| Ethyl | Methyl | 44 | 62 | --- | --- |
| Do | Ethyl | 63 | 47 | 64 | 74 |
| Do | Carboxymethyl | 74 | 80 | 77 | --- |

Candidate nematocides were screened against the rootknot nematode, as follows: An inoculum consisting of finely chopped roots of highly infested tomato plants, and the chemical to be tested, are blended thoroughly with sufficient potting soil to give the desired concentration of chemical, as calculated in terms of pounds per acre. Young tomato plants are then potted in this soil, and the degree of rootknot infestation noted at the end of four weeks. Table 4 below presents results for representative compounds, expressed in terms of severity of infestation for two different concentrations of chemical toxicant. The rating 1 symbolizes 1–25% infestation, and 2 symbolizes 26–50% infestation.

Table 4.—Nematocidal activity

| Compound | | Severity of infestation | |
|---|---|---|---|
| R' | R | 400 lb./acre | 200 lb./acre |
| Ethyl | Methyl | --- | 1 |
| Do | Ethyl | 1 | 1 |
| Do | Isobutyl | 1 | 2 |
| Do | n-Octyl | 2 | 2 |
| Do | Phenyl | 1 | 1 |

This application is a continuation-in-part of copending application Serial No. 597,886, filed July 16, 1956.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A compound of the formula:

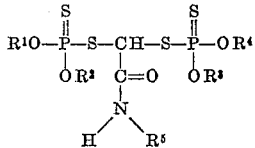

wherein $R'$, $R^2$, $R^3$, and $R^4$ each represents a lower alkyl radical and $R^5$ represents an alkyl radical having from 1 to 8 carbon atoms.

2. A compound of the formula:

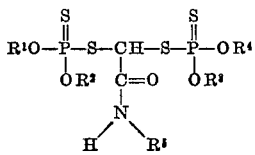

wherein $R'$, $R^2$, $R^3$, $R^4$ and $R^5$ each represents a lower alkyl radical.

3. Bis(S - (diethoxyphosphinothioyl)mercapto) - (N-methylcarbamyl)methane.

4. Bis(S - (diethoxyphosphinothioyl)mercapto) - (N-2-propylcarbamyl)methane.

5. Bis(S - (diethoxyphosphinothioyl)mercapto) - (N-phenylcarbamyl)methane.

6. Bis(S-(di-2-propoxyphosphinothioyl)mercapto)-(N-ethylcarbamyl)methane.

7. Bis(S - (dimethoxyphosphinothioyl)mercapto) - (N-ethylcarbamyl)methane.

8. A method of destroying pests comprising contacting said pests with a toxic concentration of a compound of the formula:

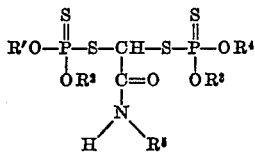

wherein $R'$, $R^2$, $R^3$, $R^4$ and $R^5$ each represents a lower alkyl radical.

9. A pesticidal composition comprising as an essential active ingredient, in toxic concentration, a compound of the formula:

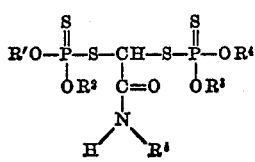

wherein $R^1$, $R^2$, $R^3$, and $R^4$ each represents a lower alkyl radical and $R^5$ represents an alkyl radical having between 1 and 8 carbon atoms.

10. A pesticidal composition comprising as an essential active ingredient, in toxic concentration, a compound of the formula:

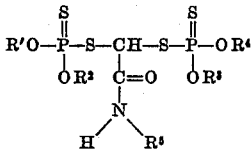

wherein $R^1$, $R^2$, $R^3$, $R^4$, and $R^5$ each represents a lower alkyl radical.

11. A compound of the formula:

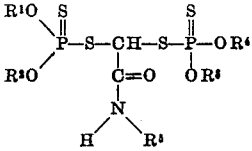

wherein $R'$, $R^2$, $R^3$ and $R^4$ each represents a lower alkyl radical and $R^5$ is selected from the group consisting of hydrogen, alkyl having from 1 to 8 carbon atoms, allyl, benzyl, phenylethyl, cyclohexyl, phenyl, 4-chlorophenyl, 4-nitrophenyl, 4-methoxyphenyl, and carboxymethyl.

12. A pesticidal composition comprising as an essential active ingredient, in toxic concentrations, a compound of the formula:

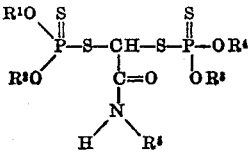

wherein $R'$, $R^2$, $R^3$ and $R^4$ each represents a lower alkyl radical and $R^5$ is selected from the group consisting of hydrogen, alkyl having from 1 to 8 carbon atoms, allyl, benzyl, phenylethyl, cyclohexyl, phenyl, 4-chlorophenyl, 4-nitrophenyl, 4-methoxyphenyl, and carboxymethyl.

13. A method of destroying pests, comprising contacting said pests with a toxic concentration of a compound having the general formula:

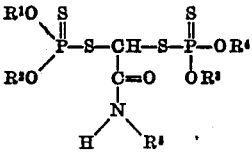

wherein $R'$, $R^2$, $R^3$ and $R^4$ each represents a lower alkyl radical and $R^5$ is selected from the group consisting of hydrogen, alkyl having from 1 to 8 carbon atoms, allyl, benzyl, phenylethyl, cyclohexyl, phenyl, 4-chlorophenyl, 4-nitrophenyl, 4-methoxyphenyl, and carboxymethyl.

No references cited.